(12) United States Patent
Swanick et al.

(10) Patent No.: US 6,304,828 B1
(45) Date of Patent: Oct. 16, 2001

(54) SYSTEM AND METHOD FOR CALIBRATING A SIGNAL DETECTION THRESHOLD CIRCUIT

(75) Inventors: David J. Swanick, Wakefield, RI (US); William P. Huntley, Old Lyme, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/287,171

(22) Filed: Apr. 2, 1999

(51) Int. Cl.[7] .................................................. G01R 35/00
(52) U.S. Cl. ...................... 702/107; 702/106; 702/190; 702/191; 702/193; 702/195; 342/90; 342/162; 455/212; 340/310; 375/317
(58) Field of Search .................................... 702/107, 106, 702/69, 190, 191, 193, 195, FOR 107, FOR 164, FOR 166, FOR 170

(56) References Cited

U.S. PATENT DOCUMENTS

| | | | |
|---|---|---|---|
| 4,005,415 | * | 1/1977 | Kossiakoff et al. ................... 342/90 |
| 4,646,254 | * | 2/1987 | O'Conner et al. ................... 702/193 |
| 4,648,126 | * | 3/1987 | Toffolo ................................. 455/212 |

* cited by examiner

*Primary Examiner*—Arthur T. Grimley
*Assistant Examiner*—Mohamed Charioui
(74) *Attorney, Agent, or Firm*—Michael J. McGowan; Robert W. Gauthier; Prithvi C. Lall

(57) ABSTRACT

The system and method for calibrating a signal detection threshold circuit is used in a radio frequency (RF) receiver, such as a in an early warning radar (EWR) system, in which a signal detection threshold circuit rejects signals below a predetermined threshold setting and prevents noise signals from causing false alarms. The system and method include setting an initial threshold setting and receiving noise signals in one or more channels. A threshold comparison circuit rejects noise signals below the threshold setting, and a pulse repetition frequency (PRF) detection circuit detects noise pulses above the threshold setting and determines the PRF. An automatic threshold determiner and setter determines whether the PRF has reached a predetermined frequency (e.g., 400 kHz) and lowers the threshold setting until the predetermined frequency is reached. When the predetermined frequency is reached the threshold setting is stored as a noise measurement. The process is repeated until a plurality of noise measurements are made in each signal channel, and the average value of the noise measurements are used to determine the calibrated threshold setting. A calibration indicator provides an indication of whether each of the signal channels has been properly calibrated.

14 Claims, 5 Drawing Sheets

SYSTEM AND METHOD FOR CALIBRATING A SIGNAL DETECTION THRESHOLD CIRCUIT

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to signal detection threshold circuits, and more particularly, relates to a system and method for automatically calibrating a signal detection threshold circuit.

(2) Description of the Prior Art

Signal detection threshold circuits are commonly used in receivers to prevent false signals from being detected by the receiver as a result of random noise. The signal detection threshold circuit determines whether the signals received are above a predetermined voltage or threshold setting. Only those signals of interest that exceed this threshold setting are passed on for detection by the receiver. Noise or other signals having an amplitude lower than the threshold setting are rejected by the signal detection threshold circuit.

Previously, technicians had to manually adjust receiver signal detection thresholds, and often the adjustment was made incorrectly. Setting the threshold too high caused a loss of sensitivity. In an early warning radar (EWR) system, for example, pulsed radio frequency (RF) signals will go undetected when the threshold is set too high. When the threshold is manually set too low, false signals are detected by the receiver due to random noise crossings.

This manual threshold alignment process was further complicated by the presence of signals in the environment. In some cases, radio frequency pre-amplifiers are remotely located from the receiver and outside signals cannot be isolated from the receiver detection circuits during calibration. This commonly occurs in military vessels and aircraft. In a submarine, for example, the pre-amplifier is often located in a periscope or an antenna mast close to the receiver antenna. Technicians must work around interfering signals to manually align signal detection thresholds in these systems. Manual alignment in such systems is time consuming and often results in an incorrect alignment and inadequate receiver performance.

SUMMARY OF THE INVENTION

One object of the present invention is to align signal detection thresholds in signal detection receivers to optimize receiver sensitivity for detection of pulsed RF signals, while limiting the false alarm rates due to random noise crossings.

Another object of the present invention is to automatically align signal detection thresholds in the presence of normally interfering signal environments.

A further object of the present invention is to quickly and accurately align the receiver signal detection threshold for the best achievable receiver performance and eliminate the possibility of operator error.

The present invention features a method of calibrating a signal detection threshold circuit comprising the steps of:

a. setting a threshold setting at an initial threshold value;

b. receiving noise signals in at least one signal channel in the signal detection threshold circuit;

c. rejecting each of the noise signals lower than the threshold setting;

d. determining a pulse repetition frequency (PRF) of noise pulses greater than the threshold setting;

e. lowering the threshold setting by a predetermined increment and repeating steps a–c until the pulse repetition frequency of the noise pulses is greater than a predetermined frequency;

f. storing the threshold setting as a noise measurement when the pulse repetition frequency is greater than the predetermined frequency;

g. repeating steps a–e until a predetermined number of noise measurements are made for the signal channel;

h. determining an average value of the predetermined number of noise measurements and setting the threshold setting to the average value when a predetermined number of acceptable noise measurements are made in the signal channel;

i. indicating successful calibration of the signal channel in the signal detection threshold circuit when a predetermined number of acceptable noise measurements are made in the signal channel; and j. indicating unsuccessful calibration of the signal channel in the signal detection threshold circuit when a predetermined number of unacceptable noise measurements are made in the signal channel.

The method preferably includes receiving noise signals in a plurality of signal channels, wherein steps a–j are performed for each of the plurality channel signals. The preferred method further includes repeating steps a–j for the signal channel if the predetermined number of acceptable noise measurements are not made in each signal channel. If the predetermined number of acceptable noise measurements are not made in the signal channel after repeating steps a–j for a predetermined number of times, the threshold setting is set to a default value.

According to one example, after the step of storing the threshold setting as the noise measurement, the method includes the steps of determining whether the noise measurement is greater than a predetermined maximum acceptable value or whether the noise measurement is less than a predetermined minimum acceptable threshold value. When the noise measurement is greater than the maximum acceptable value or less than the predetermined minimum acceptable value, the noise measurement is deemed an unsuccessful noise measurement. The method also includes the steps of providing an indication of excessive noise in the channel when the noise measurement is determined to be greater than the predetermined maximum acceptable value; and providing an indication of insufficient noise in the channel when the noise measurement is determined to be less than the predetermined minimum acceptable value.

The present invention also features an automatic signal detection threshold calibration system. The system comprises a plurality of signal channels for receiving and carrying a plurality of signals including noise signals. A threshold comparer is coupled to each of the signal channels for comparing the noise signals to a threshold setting and for rejecting each of the noise signals below the threshold setting. A detector is coupled to the threshold comparer for determining a pulse repetition frequency of each of the noise signals above the threshold setting. An automatic threshold determiner and setter is coupled to the detector for automatically determining the threshold setting by setting the threshold setting at an initial threshold value and lowering the threshold setting until the pulse repetition frequency of each of the noise signals above the threshold setting is greater than a predetermined frequency. A calibration indicator responsive to the automatic threshold determiner and setter provides an indication of a proper or improper calibration in each of the signal channels.

BRIEF DESCRIPTION OF THE DRAWINGS

These and other features and advantages of the present invention will be better understood in view of the following description of the invention taken together with the drawings wherein like reference numerals refer to like parts and wherein.

DESCRIPTION OF THE PREFERRED EMBODIMENT

Figure 1:
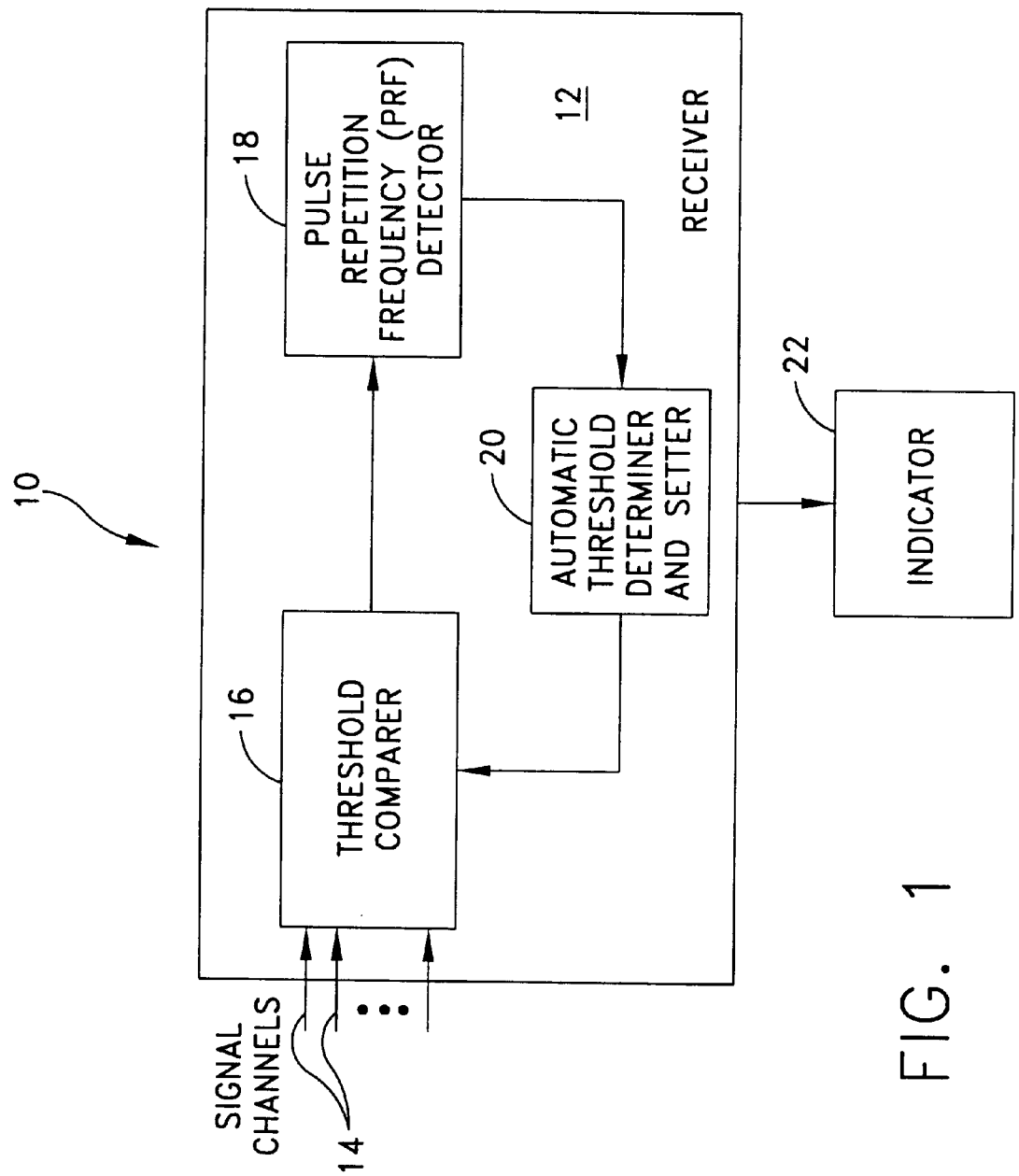
FIG. 1 is a schematic block diagram of the automatic signal detection calibration system, according to the present invention.

The automatic signal detection threshold calibration system 10, FIG. 1, according to the preferred embodiment, automatically calibrates a signal detection threshold circuit, for example, in a receiver 12 in an early warning radar (EWR) system. In the exemplary embodiment, the automatic signal detection threshold calibration system and method is used in an EWR system that detects pulsed RF or radar signals having a pulse repetition frequency (PRF) in one or more radio frequency (RF) bands. The present invention contemplates using the automatic signal detection threshold calibration system and method in any type of receiver or signal detection system.

In general, the automatic signal detection threshold calibration system 10 includes one or more signal channels 14, a threshold comparer 16 coupled to the signal channels 14, a PRF detector 18 coupled to the threshold comparer 16, and an automatic threshold determiner and setter 20 coupled to the threshold comparer 16 and to the PRF detector 18. During normal operation, one or more signals, such as pulsed RF signals, are received on the signal channels 14. The threshold comparer 16 compares the received signals to a predetermined threshold voltage setting and rejects any signals having an amplitude less than the predetermined threshold voltage setting. The PRF detector 18 detects the PRF of the signal pulses that exceed the predetermined voltage setting. An indicator 22, responsive to the receiver 12, provides visual indications of the detected signals and the PRF ranges. Thus, the threshold comparer 16 allows processing of only those signal levels that are above the threshold voltage and prevents inherent noise levels from being detected as pulsed RF signals and causing false alarms.

During calibration mode, the automatic threshold determiner and setter 20 automatically determines the threshold setting used by the threshold comparer 16 based upon the noise signals present in the signal channels 14. To do this, the automatic threshold determiner and setter 20 first sets the threshold voltage setting at an initial threshold value. Noise signals are received on one or more of the channels 14, and any noise pulses that exceed the threshold setting will be passed by the threshold comparer 16 to the PRF detector 18 to detect the PRF (or false alarm rate) of the noise pulses exceeding the threshold. The automatic threshold determiner and setter 20 then lowers the threshold setting until the false alarm rate reaches a predetermined frequency to determine the calibrated threshold setting that will prevent random noise pulses from causing false alarms while maintaining the sensitivity of the receiver, as will be described in greater detail below. The indicator 22 provides an indication of the proper or improper calibration of each of the signal channels 14.

Figure 2:
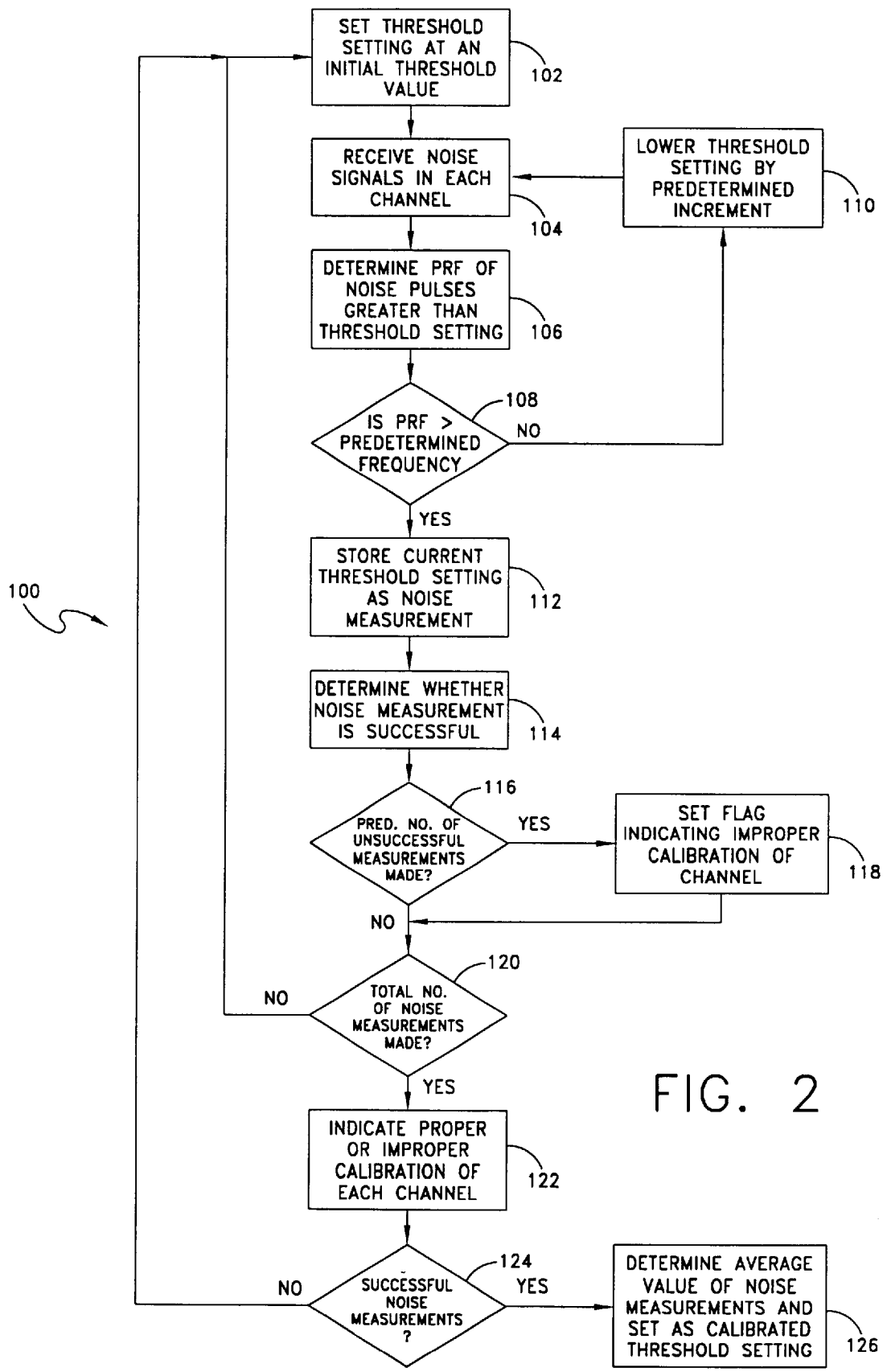
FIG. 2 is a flow chart of the method of calibrating a signal detection threshold circuit, according to the present invention.

According to the preferred embodiment, the method 100, FIG. 2, of calibrating the signal detection threshold circuit begins by setting the threshold setting at the initial threshold value, step 102. Noise signals are received in each of the channels, step 104. The PRF (or false alarm rate) of any noise pulses greater than the threshold voltage setting is then determined for each of the channels, step 106. The PRF (or false alarm rate) of the noise signals in each of the channels is then compared to the predetermined frequency, step 108. If the PRF of the noise signals is less than the predetermined frequency, the threshold setting is lowered by a predetermined increment, step 110. The threshold voltage setting is thus lowered incrementally until the PRF (or false alarm rate) of the detected noise pulses reaches the predetermined frequency. At that point, the threshold voltage setting is then stored as a noise measurement, step 112.

In one example, the predetermined frequency is 400 kHz, which is above the modulation rate of most signals. Thus, the threshold voltage setting is lowered incrementally until the PRF (or false alarm rate) of the detected noise pulses reaches 400 kHz. Since this predetermined frequency of 400 kHz is above the modulation rates of most signals, very few signals will go undetected and there will be a minimal loss of sensitivity in the receiver.

The preferred method then determines whether the noise measurement in each channel is successful or acceptable, step 114. The noise measurement will be unsuccessful, for example, if the noise level is excessive (i.e., exceeds a predetermined maximum acceptable voltage level) or is insufficient (i.e., is less than or equal to a predetermined minimum acceptable voltage level). This process is repeated and a number of noise measurements are made for each of the signal channels. As each of the noise measurements are made, the unsuccessful or unacceptable (e.g., excessive or insufficient) noise measurements are counted. If a predetermined number of unsuccessful measurements are made, step 116, a flag is set indicating improper calibration of that channel, step 118. A visual indication of the noise level measured in each channel can also be provided during the calibration using the indicator 22.

Once a total predetermined number of noise measurements have been made, step 120, an indication is made of proper or improper calibration of each channel, step 122. If the flag was set after a predetermined number of unacceptable noise measurements in a channel, for example, an indication of improper calibration is made for that channel. If any channels have not properly calibrated as a result of unsuccessful noise measurements, step 124, the process can be repeated to attempt a re-calibration of those channels. In one example, excessive or insufficient noise measurements during re-calibration attempts will not be considered unsuccessful or unacceptable and will not result in an improper calibration.

Once the predetermined number of acceptable noise measurements are made for each of the channels, step 124, the noise measurements for each of channels are averaged and the average value is used as the calibrated threshold setting, step 126. If a channel still has not been properly calibrated after a o re-calibration attempt, the calibrated threshold setting can be set to a default value for the uncalibrated channel.

Figure 3A:
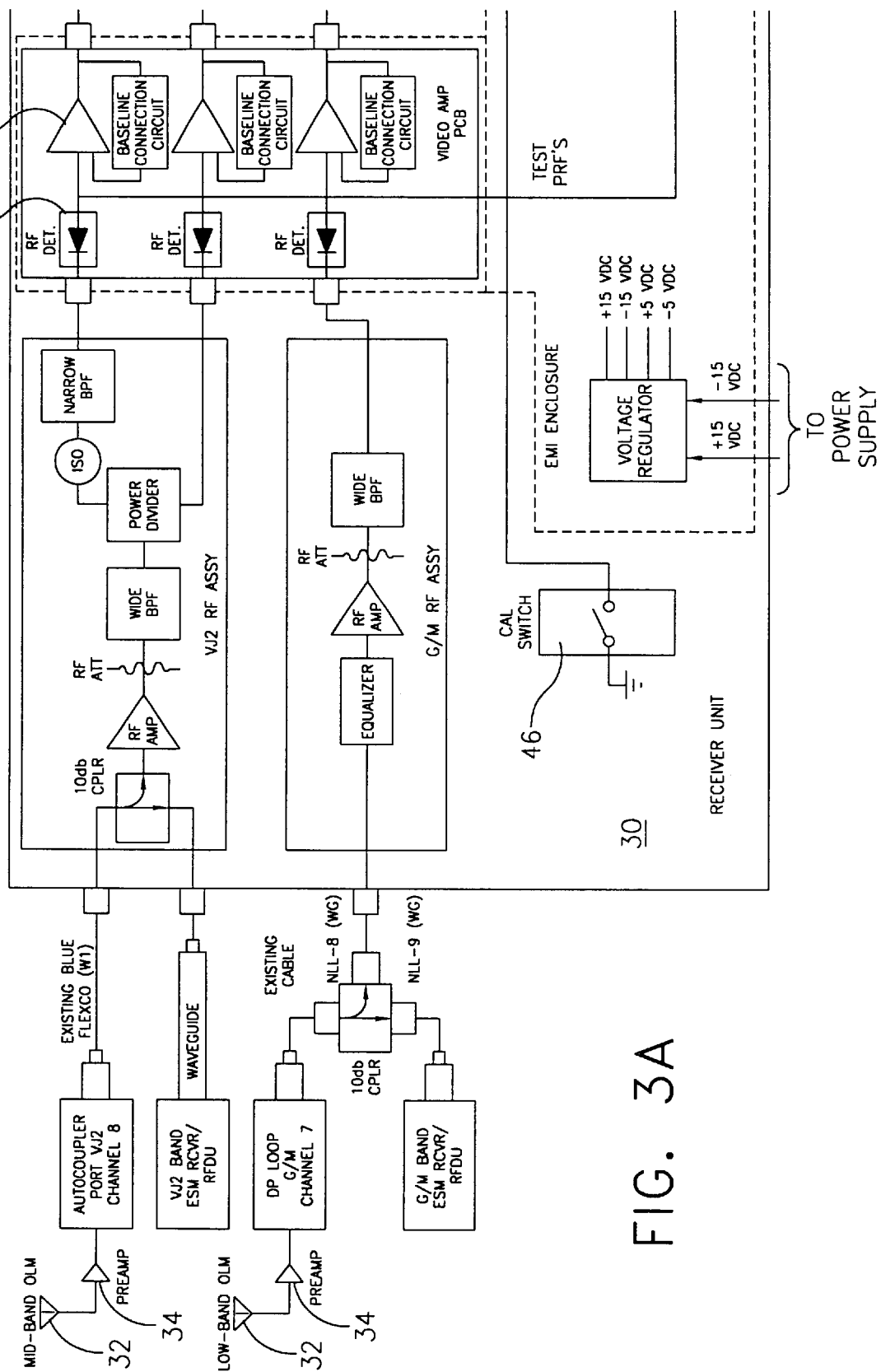
FIGS. 3A and 3B is a schematic functional block diagram of the receiver unit including the automatic signal detection threshold calibration system, according to one embodiment of the present invention; at FIG. 4 is a functional block diagram of a remote unit for monitoring calibration, according to one embodiment of the present invention.
Figure 3B:
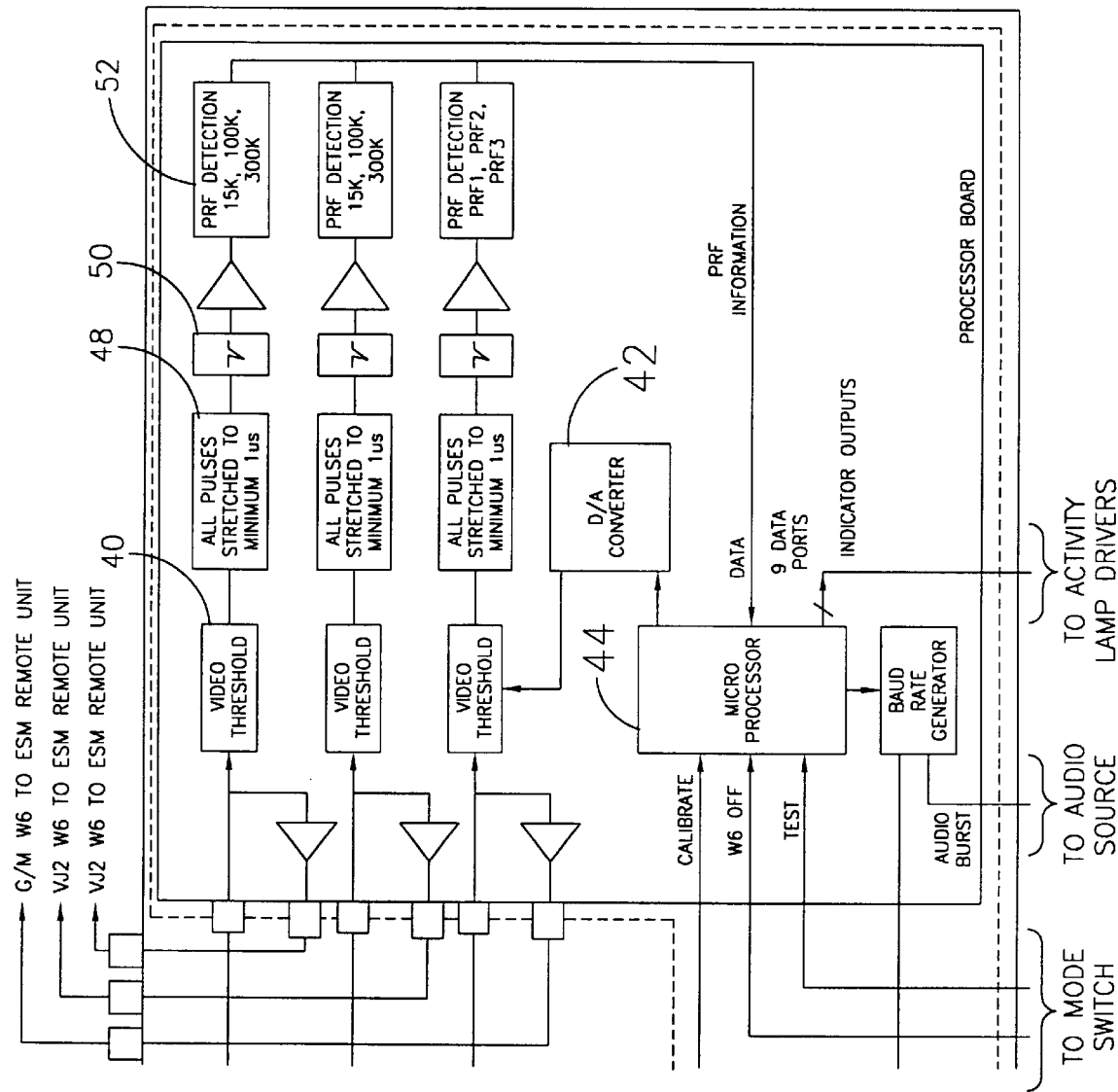

In the exemplary embodiment, the calibration system and method of the present invention is implemented in a three channel receiver unit 30, FIGS. 3A and 3B having two wideband and one narrowband RF channels. Signals are received by antennas 32 located, for example, in a periscope antenna stack on a submarine. Low noise pre-amplifiers 34 located near the antennas 32 provide RF amplification and sufficient gain to amplify the received signals and adjust the signal path noise power to the level necessary to noise limit the receiver and optimize the receiver for sensitivity. The received signals are then passed to the remotely located receiver unit 30. The receiver unit 30 includes RF detectors 36 for detecting the pulsed RF signals in each of the channels and video amplifiers 38 for amplifying the low level outputs from the RF detectors 36 and converting from RF frequencies to video.

In this example of the receiver unit 30, the threshold comparer includes video comparator circuits 40 that receive the amplified video signals and compare the signals to the threshold voltage setting set for desired receiver performance in accordance with the method disclosed above. In the exemplary embodiment, the video comparator circuits 40 include MAX901 comparators that reject all video signals below the threshold setting. The incoming video lines into the MAX901 comparators preferably are terminated with a 75 ohm resistor and connected to a resistor/diode combination that provides some filtering and prevents the video signal from dropping below–0.7 volts, which could damage the MAX901 comparators. According to the preferred exemplary embodiment, two zener diodes provide the MAX901 comparators with a positive analog supply voltage of 9 volts, while 1N4148 diodes keep the negative analog supply voltage at or above–0.7 volts.

In this example of the receiver unit 30, the automatic threshold determiner and setter includes a digital to analog converter (DAC) 42 coupled to and controlled by a microprocessor 44 that calculates the threshold setting according to the method described above. One example of the DAC is a MAX526 DAC having an 8-bit data bus, two address lines, two chip select lines, a read line, a write line and a load data line. Using this 12-bit DAC, setting a threshold is a two stage process. First, the high and low bytes of the threshold settings are written to the appropriate register with the first using the CSM chip select line and the second using the CSL chip select line, such that the high and low bytes of the threshold setting are separated in external memory space into their own 8-byte sections. After the threshold settings are written to the appropriate DAC register, a low pulse on the LDAC input of the chip sets the output to their programmed levels. The MAX901 comparators are coupled to the MAX526 DAC through the comparator's+input port and reject all video signals below the programmed voltage levels provided by the MAX526 DAC.

The exemplary receiver unit 30 further includes a pulse stretcher 48 that stretches the narrow video pulses into pulses with at least 1 $\mu$sec pulse width. The pulse stretcher 48 preferably includes a 1N5711 diode, a 30 pF capacitor, and a 33 K$\Omega$ resistor. A Schmitt trigger provides further noise immunity, and the video signal is then differentiated by a differentiator 50, such as a 100 pF capacitor and a 1 K ohm resistor. These circuits stretch and filter narrow noise pulses so that small video signals near the threshold level do not appear to be a multitude of pulses.

According to the exemplary embodiment of the receiver unit 30, the PRF detector includes PRF detection circuits 52 that detect the PRF range of the video signals, which corresponds to the PRF of the RF signals detected. For example, the PRF detection circuits 52 detect whether the RF signals are in a PRF range of 15 kHz, 100 kHz, or 300 kHz. The PRF detection circuits 52 then transmit the PRF information to the microprocessor 44. During normal operation, the microprocessor 44 provides audio and visual control signals to indicators at a remote location, for providing an indication of the PRF range of the detected signals.

The receiver unit 30 also includes a calibration switch 46 coupled to the microprocessor 44 that allows the user to initiate the calibration mode. During calibration mode, the PRF detection circuits 52 used for PRF detection are used for noise detection, i.e., to detect the PRF or false alarm rate of the noise signals present in each of the three channels. In the exemplary embodiment, mid and low PRF detection circuits (e.g., 15 kHz and 100 kHz) are ignored while the high PRF detection circuit (e.g., 300 kHz) is used to measure the PRF or false alarm rate of the noise as the threshold setting is lowered into the noise.

In the exemplary receiver unit 30, the microprocessor 44 sets the threshold voltage setting in the DAC 42 at an initial threshold value of 6.25 volts. The receiver unit 30 then receives and processes the noise signals in the same manner as during normal operation. The microprocessor 44 incrementally lowers the threshold voltage setting by 1.8 mV increments, and the PRF detection circuits 52 check for noise pulses having a PRF greater than the predetermined frequency of 400 kHz. When a predetermined number of noise pulses arrive at a rate greater than the predetermined frequency, an alarm is raised and a signal is sent to the microprocessor 44, which stores the current threshold voltage setting in the DAC 42 as a noise measurement.

In the exemplary receiver unit 30, if the threshold voltage setting is greater than or equal to 1.287 V in the first two channels or 395 mV in the third channel, the measurement is deemed to be excessive and unsuccessful for the pass. If the threshold voltage setting is less than or equal to 163 mV in the first two channels or 50 mV in the third channel, the noise measurement is deemed to be low. These maximum and minimum acceptable noise measurement are for the 3 channel receiver unit 30 shown in the exemplary embodiment, and the present invention contemplates various maximum and minimum acceptable voltage settings for receivers that operate in different bandwidths or different signal path gain.

According to one example of calibrating the exemplary receiver unit 30, twenty noise measurements are taken in each of the three signal channels. If six unsuccessful noise measurements are made in a channel (e.g., excessive or insufficient noise) before making fifteen successful noise measurements, the flag is set indicating improper calibration of that channel. After the initial pass is made through all of the channels, an attempt is made to calibrate those channels that were not properly calibrated in the first pass.

Each of the uncalibrated channels is re-calibrated in numerical order, and the recalibration efforts end after either all the channels have been properly calibrated or three total unsuccessful attempts have been made to calibrate any combination of channels. For example, if only one channel failed calibration on the first pass, then three attempts are made to calibrate that channel. If two channels fail on the first pass, then two attempts are made on one of those channels and one attempt is made on the other channel. If all three channels had unsuccessful noise measurements during the first pass, then re-calibration attempts are made in turn for each of the channels. During the re-calibration attempts, an indication of excessive or insufficient noise is provided, but those noise measurements are still considered valid.

After a channel is properly calibrated, the average noise measurement is determined for that channel (e.g., the average of the twenty noise measurements) and is multiplied by a constant to determine the threshold voltage setting up to a maximum of 4 volts. Any channels that did not calibrate successfully are set to a default threshold voltage setting of 4 volts. The threshold voltage settings for the channels are then stored in memory, such as non-volatile SRAM within the microprocessor 44.

Figure 4:
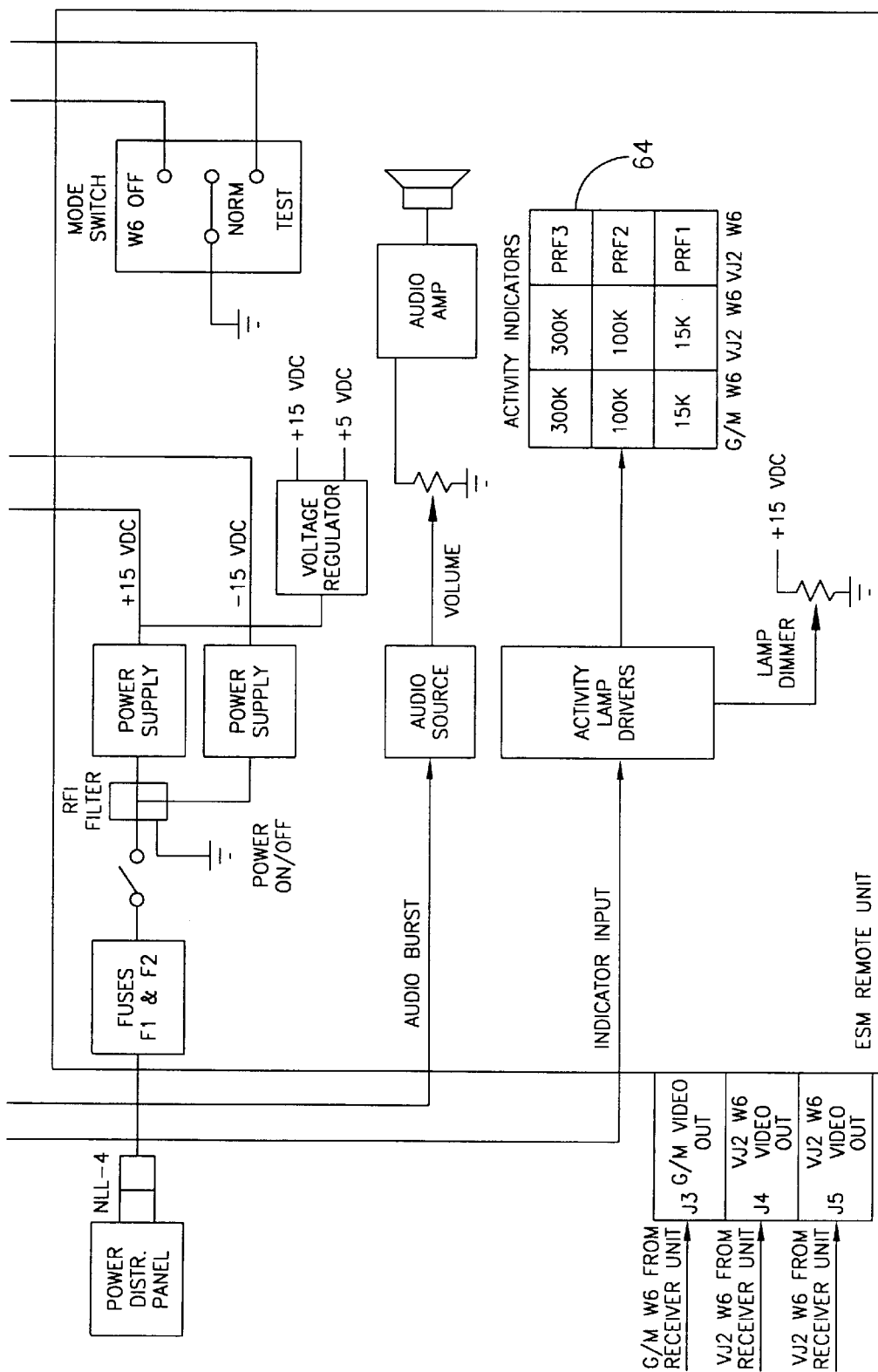

According to the exemplary embodiment, one or more remote units 60, FIG. 4, are responsive to the receiver unit 30 and provide an indication of the signals received by the receiver unit 30. The remote unit(s) 60 includes one or more activity indicators, such as LED indicators 64. During normal operation, the activity indicators 64 provide an indication of the PRF range and the RF bands of the RF signals detected by the receiver unit 30.

During calibration mode, the activity indicators 64 provide an indication of excessive noise levels, insufficient noise levels, and acceptable noise levels in each of the channels. For example, a flashing high PRF LED (e.g., 300 kHz) in a channel indicates that the system is currently finding excessive noise in that channel. The low PRF LED (e.g., 15 kHz) indicates when there is insufficient noise in that channel. The middle PRF LED (e.g., 100 kHz) indicates an acceptable reading for the channel.

The activity indicators 64 also provide an indication of proper or improper calibration. For example, upon completion of calibration, those channels that did not successfully calibrate will flash all three LED indicators until the system is returned to normal operation. If the calibration was successful in every channel, all of the LED indicators will be lit and not flashing until the system is returned to normal operation.

Accordingly, the automatic signal threshold calibration system and method of the present invention provides quick and accurate alignments of signal detection thresholds and can be incorporated into any RF pulse detecting receiver set. The system and method calibrates the threshold settings in the presence of normally interfering signal environments and eliminates the possibility of operator error to align the receiver signal detection threshold for the best achievable performance. The system and method of the present invention further checks the signal path noise power performance during the calibration process.

What is claimed is:

1. A method of calibrating a signal detection threshold circuit comprising the steps of:
   setting a threshold setting at an initial threshold value;
   receiving noise signals in at least one signal channel in said signal detection threshold circuit;
   rejecting each of said noise signals lower than said threshold setting;
   determining a pulse repetition frequency of noise pulses greater than said threshold setting;
   lowering said threshold setting by a predetermined increment and repeating steps a-c until said pulse repetition frequency of said noise pulses is greater than a predetermined frequency;
   storing said threshold setting as a noise measurement when said pulse repetition frequency is greater than said predetermined frequency;
   repeating the threshold setting step through the threshold lowering step until a predetermined number of noise measurements are made for said at least one signal channel;
   determining an average value of said predetermined number of noise measurements and setting said threshold setting to said average value when a predetermined number of acceptable noise measurements are made in said at least one signal channel;
   indicating successful calibration of said at least one signal channel in said signal detection threshold circuit when said predetermined number of acceptable noise measurements are made in said at least one signal channel; and
   indicating unsuccessful calibration of said at least one signal channel in said signal detection threshold circuit when a predetermined number of unacceptable noise measurements are made in said at least one signal channel.

2. The method of claim 1 wherein receiving noise signals in at least one signal channel includes receiving noise signals in a plurality of signal channels, wherein said method steps are performed for each of said plurality of signal channels.

3. The method of claim 1 further including repeating said method steps for said at least one signal channel if said predetermined number of acceptable noise measurements are not made in said at least one signal channel.

4. The method of claim 3 further including the step of setting said threshold setting to a default value, if said predetermined number of acceptable noise measurements are not made in said at least one signal channel, after repeating the method steps a predetermined number of times.

5. The method of claim 1 wherein said predetermined frequency is about 400 KHz.

6. The method of claim 1 further including, after the step of storing said threshold setting as said noise measurement, the steps of:
   determining whether said noise measurement is greater than a predetermined maximum acceptable value, wherein said noise measurement is deemed an unsuccessful noise measurement when said noise measurement is greater than said predetermined maximum acceptable value; and
   determining whether said noise measurement is less than a predetermined minimum acceptable threshold value, wherein said noise measurement is deemed an unsuccessful noise measurement when said noise measurement is less than said predetermined minimum acceptable value.

7. The method of claim 6 further including the steps of:
   providing an indication of excessive noise in said at least one channel when said noise measurement is determined to be greater than said predetermined maximum acceptable value; and
   providing an indication of insufficient noise in said at least one channel when said noise measurement is determined to be less than said predetermined minimum acceptable value.

8. The method of claim 6 further including, after the step of storing said threshold setting as said noise measurement, the step of:

determining whether a predetermined number of unsuccessful noise measurements have been made in said at least one channel; and setting a flag indicating improper calibration if said predetermined number of unsuccessful noise measurements have been made.

9. The method of claim 8 further including repeating the method steps for said at least one signal channel if said predetermined number of acceptable noise measurements are not made in said at least one signal channel.

10. An automatic signal detection threshold calibration system comprising:

a plurality of signal channels for receiving and carrying a plurality of signals including noise signals;

comparing means coupled to each of said signal channels for comparing each of said noise signals to a threshold setting and for rejecting each of said noise signals below said threshold setting;

detection means coupled to said comparing means for determining a pulse repetition frequency of each of said noise signals above said threshold setting; and threshold determining and setting means coupled to said detection means for automatically determining said threshold setting by setting said threshold setting at an initial threshold value and lowering said threshold setting until said pulse repetition frequency of said each of said noise signals above said threshold setting is greater than a predetermined frequency.

11. The automatic signal detection threshold calibration system of claim 10 further including a calibration indicating means responsive to said automatic threshold determining and setting means for indicating proper or improper calibration of each of said plurality of signal channels.

12. The automatic signal detection threshold calibration system of claim 10 wherein said comparing means includes a plurality of comparators for receiving each of said noise signals and for comparing each of said noise signals to said threshold setting.

13. The automatic signal detection threshold calibration system of claim 12 wherein said detection means includes a plurality of pulse repetition frequency detection circuits for determining said pulse repetition frequency of each of said noise signals.

14. The automatic signal detection threshold calibration system of claim 13 wherein said threshold determining and setting means includes:

a microprocessor coupled to said pulse repetition frequency detection circuit, for determining whether said pulse repetition frequency of each of said noise signals is greater than said predetermined frequency and for determining said threshold setting; and a digital to analog converter coupled to said microprocessor and coupled to each of said comparators for setting said threshold setting in each of said comparators.

* * * * *